(12) United States Patent
Meindl

(10) Patent No.: US 9,713,888 B2
(45) Date of Patent: Jul. 25, 2017

(54) INTEGRATED CONTACT HEATING FOR THERMOPLASTICALLY BOUND MATS IN AN INJECTION-MOLDING TOOL

(71) Applicant: International Automotive Components Group GmbH, Krefeld (DE)

(72) Inventor: Wolfgang Meindl, Markt Schwaben (DE)

(73) Assignee: International Automotive Components Group GmbH, Duesseldorf (DE)

(*) Notice: Subject to any disclaimer, the term of this patent is extended or adjusted under 35 U.S.C. 154(b) by 690 days.

(21) Appl. No.: 13/953,592

(22) Filed: Jul. 29, 2013

(65) Prior Publication Data

US 2014/0027947 A1 Jan. 30, 2014

(30) Foreign Application Priority Data

Jul. 30, 2012 (DE) .................. 10 2012 106 936

(51) Int. Cl.
*B29C 45/16* (2006.01)
*B29C 51/42* (2006.01)
(Continued)

(52) U.S. Cl.
CPC ...... *B29C 45/1671* (2013.01); *B29C 45/1418* (2013.01); *B29C 51/421* (2013.01);
(Continued)

(58) Field of Classification Search
CPC ............ B29C 45/1418; B29C 45/1671; B29C 2045/14286; B29C 51/082; B29C 51/421; B29C 51/425; B29C 51/42
(Continued)

(56) References Cited

U.S. PATENT DOCUMENTS 4,360,329 A 11/1982 Hatakeyama
5,800,759 A 9/1998 Yamazaki et al.
(Continued)

FOREIGN PATENT DOCUMENTS

DE 10 2004 054 228 A1 6/2006
DE 10 2010 019 625 A1 12/2010
(Continued)

*Primary Examiner* — Alison L Hindenlang
*Assistant Examiner* — Lawrence D Hohenbrink, Jr.
(74) *Attorney, Agent, or Firm* — Grossman, Tucker, Perreault & Pfleger, PLLC

(57) ABSTRACT

The invention proposes a device for manufacture of a composite piece, which exhibits a shaped plate and at least one plastic functional piece molded on to the shaped plate. The device has a heater for heating a plate blank; a shaping tool with at least two shaping elements and for admitting and shaping of the plate blank, to bring the plate blank into a desired shape and thus to manufacture the shaped plate; means for insertion of a shaped mass into the shaping tool for molding the plastic functional piece onto the shaped plate in the shaping tool to manufacture the composite piece, wherein the shaping tool is so configured that after the shaping of the plate blank, at least one cavity remains, in which the plastic functional piece is shaped; and a closing unit for opening and closing the shaping tool; wherein the heater is integrated into the closing unit and the closing unit is furnished to open and close the heater.

6 Claims, 1 Drawing Sheet

(51) Int. Cl.
    *B29C 45/14*  (2006.01)
    *B29C 51/08*  (2006.01)
    *B29C 51/26*  (2006.01)

(52) U.S. Cl.
    CPC .......... *B29C 51/082* (2013.01); *B29C 51/262* (2013.01); *B29C 51/42* (2013.01); *B29C 51/425* (2013.01); *B29C 2045/14286* (2013.01)

(58) Field of Classification Search
    USPC .............. 425/110, 112, 126.1; 264/259, 265, 264/271.1, 279, 319, 320, 322, 325
    See application file for complete search history.

(56) References Cited

U.S. PATENT DOCUMENTS

| | | | |
|---|---|---|---|
| 6,739,856 B2 | 5/2004 | Cesano | |
| 2005/0258559 A1* | 11/2005 | Johansen | .......... B29C 45/14016 264/40.6 |
| 2006/0035090 A1* | 2/2006 | Damo | .................. B29B 13/023 428/423.1 |

FOREIGN PATENT DOCUMENTS

| | | |
|---|---|---|
| DE | 10 2011 014 538 B3 | 4/2012 |
| DE | 10 2011 054 152 A1 | 4/2012 |
| DE | 10 2010 052 180 A1 | 5/2012 |
| EP | 1 153 725 B1 | 11/2001 |
| EP | 1 495 850 B1 | 8/2007 |
| EP | 1 970 192 A2 | 9/2008 |
| EP | 1 986 835 B1 | 1/2011 |
| JP | 2010 274653 A | 12/2010 |
| WO | 2003033234 A1 | 4/2003 |
| WO | 2009019102 A1 | 2/2009 |

\* cited by examiner

INTEGRATED CONTACT HEATING FOR THERMOPLASTICALLY BOUND MATS IN AN INJECTION-MOLDING TOOL

FIELD OF THE INVENTION

The invention relates to a device and a method for manufacturing a composite part, which exhibits a shaped plate and at least one plastic functional part shaped onto the shaped plate.

BACKGROUND OF THE INVENTION

The invention is applicable for example to manufacture of composite components which exhibit a base body or carrier made of a fiber composite mat, onto which are molded functional parts made of plastic such as ribs, holder elements, reinforcing elements or attachment elements. Such composite components are used for example in automotive technology as interior paneling parts. The composite components are produced in special compression-injection molding tools, in which first the fiber composite mat is pressed in the form and compressed, and then the functional parts made of plastic are molded on. Before the deformation of the fiber composite mat, these must be brought to a defined operational temperature. In prior art it is known for this to use separate heating presses with contact heating or infrared heating. One advantage of contact heating is that therein the fiber composite mat can attain a certain preliminary compression.

Naturally the invention is also applicable to other kinds of composite parts which exhibit shaped plates made of other materials, for example plastic plates with no share of fiber, plates with a sandwich structure, etc. Additionally the invention is also applicable to composite parts onto which the plastic functional parts are shaped in another way, such as through foaming, casting or the like.

DE 10 2004 054 228 A1 describes a method and a device for manufacturing a shaped part from a natural fiber mat, with plastic functional parts shaped on. According to the method, first the plate blank containing natural fibers is heated; then the shaped part is shaped from the blank by pressing, and a plastic melt is molded onto the shaped part, to form the functional parts. For this a cavity is formed on the shaped part before the molding. A similar method is described in EP 1 986 835 B1.

Another similar method, in which a plate made of thermoplastic material is used, is described in EP 1 153 725 B1. EP 1 495 850 B1 likewise describes a method and a device for manufacturing a composite component based on a plate made of thermoplastic material, wherein according to this method the plate is pre-heated in the shaping tool itself, before plastic functional parts are molded on.

Additional examples of texts which describe the manufacture of composite components based on fiber mats with plastic functional parts molded on, are DE 10 2010 052 180 A1, DE 10 2011 014 538 B3 and DE 10 2011 054 152 A1.

One multi-platen press for heating of shaped parts or shaped part blanks, which then can be further processed in the above-described press-injection molding tool is described for example in EP 1 970 192 A1.

One drawback of the prior art is that between the heating unit for heating the plate blank and the press-composite molding tool, often relatively long paths must be traversed by appropriate transfer devices. Due to this, not only does significant expense arise for providing the transfer device, but also this involves a danger that during the transport the pre-heated plate blanks cool down and then no longer have the requisite temperature in the press-injection molding tool. True, this could be counteracted by having the plate blanks preheated to a higher temperature, but naturally this requires greater expenditure of energy, and, depending on the material of the plate blank, it could also lead to impairment of material quality. Also, the heater plates of the heating press between which the plate blank comes to lie, and the shaped parts of the composite molding tool, cannot be made to adjoin each other as closely as desired, because each tool itself requires a certain amount of space and must be accessible for operation and maintenance.

The object of the invention is to provide a device and a method for manufacturing a composite part which exhibits a shaped plate and at least one plastic functional part molded onto the shaped plate, by which the drawbacks described above can be overcome.

This problem is solved by a device according to patent claim 1 and a method according to patent claim 8. Preferred embodiments of the invention are indicated in the dependent claims.

OVERVIEW OF THE INVENTION

The invention provides a device for manufacture of a composite part, which exhibits a shaped plate and at least one plastic functional part shaped onto the plate. The device comprises a heating device for heating a plate blank, a shaping tool with at least two shaping elements to admit and shape the plate blank, to bring the plate blank into a desired shape and thus to manufacture the shaped plate, and means for inserting a shaped mass into the shaping tool and for molding the plastic functional piece onto the shaped plate in the forming tool, to produce the composite part. For this purpose, the shaping tool is configured so that after the shaping of the plate blank at least one cavity remains in which the plastic function piece is shaped. Additionally the device comprises a closing unit for opening and closing the shaping tool, with the heater integrated into the closing unit. The closing unit for the shaping tool is so set up that it also can open and close the heating device. According to the invention, the stroke for opening and closing the shaping tool is also used to open and close the heater. Thus the invention does not makes provision for two separate tools for heating of the plate blank and for deforming the plate blank and molding the function pieces, as in the prior art, but rather the heater is integrated into the press-injection molding tool. By this means, the parts of the heater between which the plate blank comes to lie, are situated close to the shaping tool, and the transfer path from the heater to the shaping-molding device is reduced to a minimum. A further advantage of the invention is that a separate heating press, including the necessary lifting mechanism, can be dispensed with. Additionally, it is not necessary to electrically couple the heating press and the press-injection molder, to adjust operation of the two machines to each other. In prior art, this is as a rule implemented by a correspondingly higher-level control device, which can be dispensed with in the invention.

Considerable cost savings are achieved via the invention for manufacture of the tool, because the closing unit of the press-injection molding tool can also be used for the heater to preheat the plate blank. Also dispensed with are extensive paths for transfer of the preheated plate blanks to the shaping tool, by which the corresponding handling apparatus can become simpler. The preheated plate blank loses considerably less temperature than on long transfer paths, which makes itself felt especially with the thinner and lighter fiber mats. Due to the shorter path, the cycling time is also shortened, because the heated plate blank can be removed in the immediate vicinity of the place where it is further processed in the press-injection molding tool.

According to one appropriate embodiment of the invention, the heater and the shaping elements are thermally insulated from each other within the closing unit. If for example fiber composite mats are to be processed to the composite part, then in practice they are pre-heated to a temperature in the order of magnitude of 200° C. or more, while the injection molding tool is tempered to a temperature in the range between, for example, 40° C. and 80° C. The temperature of the injection molded plastic mass can, for example, be in the area of 200° C. or above, and during curing of the molded plastic pieces, it can be taken away by the shaping tool. In relation to the temperature of the injection molded mass, the shaping tool must thus even be cooled. To make possible a controlled governing both of the pre-heating and of the deformation of the plate blank and of the spraying of the plastic functional tools, thermal insulation is therefore appropriate between the heater and shaped elements.

In one embodiment of the invention the device is configured as an injection-molding tool with two tool halves, with a shaping element and a part of the heater placed next to each other in one of the tool halves, and the two tool halves lying against each other and moved relative to each other by means of the closing unit, to open or to close the shaping tool and the heater by the same stroke.

In another embodiment, the invention-specific device is configured as an injection-molding tool with a multi-platen pressing structure, which exhibits at least three tool parts. The shaping elements of the shaping tool lie opposite on a first and a second tool part, and parts of the heater lie on the second and a third tool part. The tool parts are moved relative to each other by means of the closing unit.

In both embodiments, the particular tool halves or tool parts can lie vertically one over the other or next to each other in the horizontal direction. The invention is not limited to any special alignment of tool parts in a horizontal or vertical or other direction. The heater can be situated both on the ejector side and on the nozzle side of the shaping tool or next to the shaping tool. It is also possible that the tool halves or tool parts are designed to admit multiple shaping tools and/or heaters, if multiple small composite parts are to be manufactured simultaneously.

If a multi-platen pressing structure is used, the closing unit can be controlled so that the tool and the heater are opened and closed synchronously in the same stroke, or that the shaping tool and the heater are closed and opened in a tandem operation one after the other. It is also possible to simultaneously close the shaping tool and heater, for example, but the open them one after the other, or vice versa.

The shaping tool of the invention-specific device is fundamentally oriented toward deforming the plate blank and to shape one or more plastic function parts onto the shaped plate blank. In practice the plastic functional part is molded, cast or foam-mounted onto the shaped plate. In that respect the shaping tool can also be designated as a pressing-injection molding tool or as an injection molder for short, with the injection molding also comprising foam-mounting of function parts in the context of the present invention.

Additionally the invention-specific device can comprise a gripper device to place a plate blank into the heater, to remove a heated plate blank from the heater and insert it into the shaping tool, and to remove the completed composite part from the shaping tool. In one advantageous embodiment, the gripper device is configured so that it can remove a completed composite piece and hold it, while it is removing a heated plate blank from the heater and inserting it into the shaping tool and/or while it inserts a new plate blank into the heater. By this means, cycling times can be reduced, because the completed composite piece only then has to be taken out when the device is again equipped and closed. The time for heating and shaping the plate blank can then be used to transport the last completed composite piece to an appropriate reception point and deposit it there.

The invention also makes provision for a method to manufacture a composite piece of the type described above. With the method, the following basic procedural steps are carried out: insertion of the plate blank into a heater and closing of the heater; heating of a plate blank in the heater; opening of the heater and removal of the heated plate blank from the heater; insertion of the heated plate blank into a shaping tool and closing of the shaping tool, to make the plate blank into a desired shape and thus to manufacture the shaped plate; molding of the plastic functional piece onto the shaped plate in the shaping tool, to produce the composite piece; and opening of the shaping tool and removal of the composite piece from the shaping tool. According to the invention, the heater is opened and closed by the stroke for opening and closing of the shaping tool.

In principle it is possible to open or close the shaping tool and device synchronously with the same stroke or to open or close the shaping tool and heater in a tandem operation one after the other, or to combine the two types of procedures.

In one embodiment of the invention, the shaping tool and heater are synchronously opened, to remove a completed composite piece from the shaped tool, to remove a heated plate blank from the heater and to insert it into the shaping tool, and to insert a new plate blank into the heater. Then the heating tool and heater are synchronously closed, to shape the heated plate blank and to mold the function piece and to heat the new plate blank. This sequence can then be correspondingly continued.

In another embodiment of the invention, first the shaping tool is opened, to remove the completed composite piece from the shaping tool. Then the heater is opened, to remove the heated plate blank from the heater and to insert it into the now-empty shaping tool, and to insert a new plate blank into the heating device. Then the shaping tool and the heater can be closed simultaneously or sequentially, to shape the heated plate blank and to mold on the function piece, and to heat the new plate blank. This sequence is then correspondingly continued.

This second embodiment is particularly suited for composite components such as those that are hard to remove from the shaping tool and therefore require more time than the removal of the preheated plate blank from the heater. Sequential opening of the shaping tool and heater ensures that the heated plate blank does not already start to cool off before it is removed from the heater and is inserted into the shaping tool.

BRIEF DESCRIPTION OF THE DRAWINGS

The invention is explained in greater detail in what follows using preferred embodiments with reference to the drawings. Shown in the figures are:

FIG. 1 shows a top-down view of a tool half or platen 10 of the invention-specific device for manufacture of a composite piece. The tool half 10 can be an iron cast body as is customary in injection-molding machines, and exhibit an area 20 for the shaping tool and an area 30 for the heater. The area 20 exhibits an embossing surface 22 which is configured so that a plate blank (not shown) which is inserted into the tool, upon being compressed by the embossing surface 22 with a counter piece (see FIG. 2) assumes the desired shape of the shaped plate.

In the area 30, a heating plate 32 is placed, which forms a part of a contact heater, to pre-heat a plate blank which is not shown. The heating plate 32 can for example be brought by means of electrical heating wires or thermal oil to a preset temperature in controlled fashion. The invention is not limited to contact heating, and for example radiative heating which employs infrared radiation could be used to heat the plate blank.

In the embodiment shown, the area 30 for the heater is thermally insulated from the area 20 for the shaping tool, in that the entire tool part exhibits a thermal insulation 40 such as in the form of insulating plates. Instead of thermal insulation of the entire area 30, provision could also be made to only insulate the heater or heating plate itself.

Figure 1:
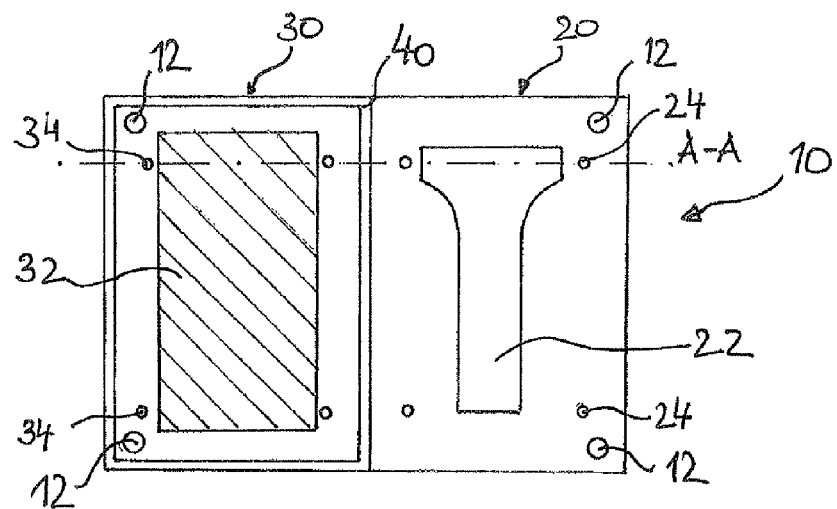
FIG. 1: a top-down view of a tool half of an invention-specific device, in which a part of the heater and a shaping element lie next to each other

In the top-down view of FIG. 1 additionally, holding pins 24, 34 are indicated, on which the plate blank can be secured. These pins 24, 34 are more easily recognized in the depiction of FIG. 2.

Finally the top-down view of FIG. 1 shows through-running boreholes 12 in the corners of the tool half 10, which serve to secure the tool half 10 to a closing unit (not shown) to be able to open and close the tool.

Figure 2:
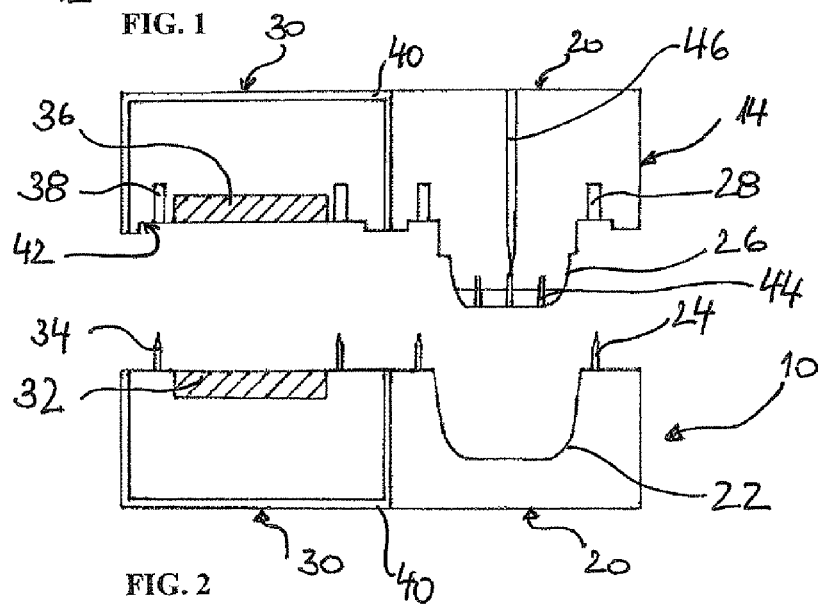
FIG. 2: a section view through the tool of FIG. 1 along the line A-A

The tool half 10 with its counter-piece 14 (second tool half or platen) is also shown in the sectional depiction of FIG. 2. The section plane runs along the line A-A in FIG. 1.

Also the second tool half 14 is divided into one area 20 for the shaping tool and one area 30 for the heater, with the areas 20, 30 here also divided by thermal insulation 40. The second tool half 14 also exhibits a heating plate (second heating plate) 36 in the area 30 for the heater, which forms a counter-piece to the first heating plate 32. The first and second heating plates 32, 36 jointly form a contact heater.

In the area 30 of the second tool half 14, boreholes 38 are also formed, which admit the holding pins 34 when the two tool halves are fitted together. Additionally perceptible in FIG. 2 is that in the surface of the second tool half 14, in the area 30, a projection 42 is formed, which serves to admit the plate blank which is not shown. With the aid of this projection 42, when the tool halves 10, 14 are closed, a clearance is set, and thus the plate blank can be pre-compressed to a preset thickness.

In the area 20 for the shaping tool, the second tool half 14 also exhibits an embossing surface 26, which, jointly with the embossing surface 22 of the first tool half 10, determines the shape of the shaped plate which is not shown. Boreholes 28 to admit the holding pins 24, when the two tool halves 10 and 14 are brought together, are provided on both sides of the embossing surface 26.

For molding of the function pieces, the second tool half 14, in the area 20 for the shaping tool, exhibits injection nozzles 44 and a channel 46 for feeding of a plastic melt. The embossing surfaces 22, 26 are configured so that after closure of the tool halves 10, 14 and the plate blank (not shown) is pressed and deformed in the shaping tool, at least one cavity remains, which defines the plastic function pieces to be formed. In this regard the shaping tool can basically be configured liked a pressing-injection molding machine known per se. The molding unit (not shown) can be designed to insert thermoplastics, duroplastics or elastomers into the cavity by injection molding. It is also possible to shape foam-applied function pieces onto the shaped plate, wherein then the reaction of the material for foaming must also occur in the cavity. Along with spray nozzles 44 and the channel 46 for the plastic melts, the injection-molding unit also has available supplying mechanisms like feed screws, dosing devices, a nonreturn valve and the like, with all of this being known from prior art.

The second tool half 14 also exhibits through-running boreholes for connection with a closing unit, not shown in FIG. 2. The closing unit not shown consists of multiple plates which are placed on a machine frame horizontally or vertically on an axis. As a rule a platen carries one half of the tool which is coupled with the molding unit; and a second plate is provided as a movable platen. On it the second tool half is mounted, which as a rule corresponds to the ejector side. This second plate is movable and, for example, slides mechanically or hydraulically in the direction of the fixed platen. Often yet a third plate is provided, namely a front plate, which has a bracing function to accumulate force and to close the platen. Additionally, if the shaping piece has a complicated configuration, sliders can be provided in the tool, to allow undercut production. All this is known from prior art. If parts are inserted or molded on as with the invention, as a rule vertical machines are used.

Figure 3:
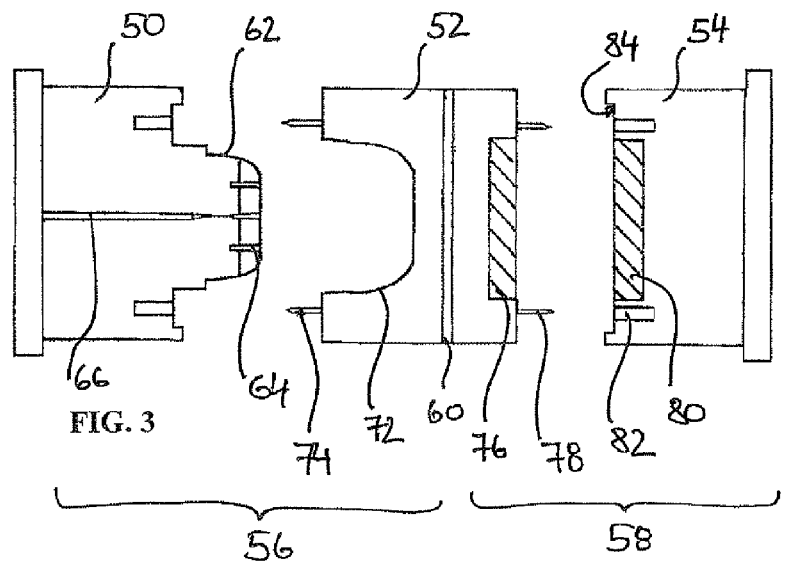
FIG. 3: a section view through a tool with three tool parts of an invention-specific device according to another embodiment.

FIG. 3 shows an alternative embodiment of the invention-specific device, which in this embodiment is configured after the manner of a multi-platen press. In this embodiment, the device comprises three tool parts 50, 52 and 54. The tool parts are designated in what follows a first platen 50, second platen 52 and third platen 54.

The first platen 50 bears a half of the shaping tool with an embossing surface 62, injection glands 64 and a channel 66 for plastic melts. The first platen 50 thus forms the nozzle side of the tool, and as a rule is configured as a fixed platen. The embossing surface 62 can be formed by a separate insert in the platen 50, to allow the tool to be used for various plate structures.

On its side that faces the first platen 50, the second platen 52 exhibits a second embossing surface 72, which determines the shape of the shaped plate (not shown) jointly with the embossing surface 62 of the first platen 50. The two embossing surfaces 62, 72 are configured so that after closing of the two platens 50, 52, pressing and deforming of the plate blank (not shown) in the shaping tool, at least one cavity remains, which defines the plastic functional pieces to be formed. In this regard the shaping tool can fundamentally be configured like a press-injection-molding machine known per se. As in the first version, in the embodiment of FIG. 3 also provision can be made on the second platen 52 for holder pins 74, on which a plate blank can be secured. These holder pins 74 engage into corresponding boreholes 68 on the opposite side of the first platen 50, when the tool is closed.

On the side of the second platen 52 turned away from the first platen 50, a heating plate 76 is placed, which forms a part of a contact heater, to preheat a plate blank (not shown). As in the first embodiment, the heating plate 76 can for example be brought in controlled fashion by electric heating wires to a preset temperature, with this embodiment also not being limited to a contact heater. Also on this side of the second platen 52, holder pins 78 are provided, on which the plate blank can be secured.

The side of the second platen 52 that carries the heating plate 76 is opposite the third platen 54, which carries a corresponding heating plate 80, which forms a counterpiece to the first heating plate 76. The first and second heating plate 76, 80 jointly form a contact heater. On both sides of second heating plate 80, on the surface of the third platen 54, boreholes 82 are configured, which admit the holder pins 78, when the two platens 52, 54 are brought together. Additionally perceptible in FIG. 3 is that on the surface of the third platen 54 a projection 84 is formed, which admits the plate blank not shown. With the aid of this projection 84, with platens 52, 54 closed, a gap is made, and thus the plate blank is pre-compressed to a preset thickness.

The three-part tool shown in FIG. 3 can be thought of as divided into an area 56 for the shaping tool and an area 58 for the heater. The two areas 56, 80 are thermally separated by thermal insulation 60. However, instead of totally thermally insulating the areas from each other, it would also be possible, for example, to surround only the heating plate 76 with thermal insulation.

In regard to the sprayer unit and the closing unit (not shown) what was said above holds true. In principle they can be configured as in the prior art. One example of a closing unit of a multi-platen contact heater that could be used with the invention, is described in EP 1 970 192 A2. In the embodiment of FIG. 3, it is in principle possible to open and close the shaping tool 56 and the heater 58 synchonously or asynchronously.

The invention-specific devices could be used as follows:

In the embodiment of FIGS. 1 and 2, simultaneously a new plate blank and a preheated plate blank the areas 30 and 20 are inserted into the first tool half 10, wherein they are positioned and fixed by holder pins 34, 24. Then the two tool halves 10, 14 are closed, with the second tool half on the nozzle side being as a rule fixed, and the other tool half 10 being movable. After closing of the tool halves, the new plate blank is pre-compressed in the area 30 and heated, while the preheated plate blank in the areas 20 is brought to the desired shape and plastic functional pieces are molded on. These two procedures should be so adjusted to each other that they are completed simultaneously. Then the two tool halves 10, 14 are opened, and the completed shaped piece can be taken out of the area 20, the preheated plate is shifted over from the area 30 into the area 20, and a new plate blank is inserted into area 30. For handling of the plate blanks and completed shaped pieces, a gripper device (not shown) can be used, which only needs to traverse a very short section to transfer the preheated plate blank from the area 30 into the area 20, and the plate blank either does not cool off during the transfer, or not appreciably. On the other hand, the time during which the tool is closed for preheating and shaping of the plate blank and for molding on of the functional pieces, can be used to set aside the completed composite piece and make a new plate blank available directly beside the tool. By this means, the cycle times of the manufacturing process can be shortened.

A similar operational sequence results with the tool of FIG. 3, if the tool is synchronously closed and opened in both areas 56 and 58. Only the motion sequence of the gripper device needs to be appropriately adjusted.

However, the configuration of FIG. 3 can also be run so that the shaping tool and heater are not always simultaneously opened and closed. For example, it is possible first to move out the first and second platens 50, 52—thus area 56 for the shaping tool—to admit a completed composite piece from the shaping tool, while the heater in area 58 remains closed. Then the platens 52, 54 are moved out, to admit a pre-heated plate blank and insert it into the shaping tool. Then the platens 50, 52 can be moved in to start the process of shaping and molding, before a new plate blank is inserted into the heater; or, in an alteration, first a new plate blank is inserted into the area 58 between the two heating plates 76, 80, and then the entire tool, thus all of the platens 50, 52, 54 are moved in, to simultaneously preheat a new plate blank and to deform the previously preheated plate blank and to mold on the plastic functional pieces. This flexibility in opening and closing the two areas 56, 58 for the shaping tool and the heater is advantageous in that the process can be adapted if, for example, removal of a completed composite piece from the shaping tool is cumbersome or if more time is needed for the shaping and injection molding process than for the preheating of the plate blank. This flexibility makes possible further optimization of the production cycling time.

Composite components which can be manufactured by the invention-specific device and the method, may exhibit a plate made of a fiber composite material which obtain natural fibers, plastic fibers, glass fibers, wood fibers and the like. The fibers can be thermoplastically bound. However, it is also possible to manufacture the composite piece from plastic plates or a fiber share or to use a sandwich material. The sprayed-on plastic pieces can be manufactured from all currently used plastics such as PP, PPE, PA, and form ribs, holding devices, reinforcing or attachment elements, to name just a few examples. The heating plates are heated to temperatures in the order of magnitude of 200° C. or more, depending on the materials used. Also, the tool halves for the shaping tool are tempered to a temperature in the range between, for example, 40° C. and 80° C., to cool off the injection plastic mass in controlled fashion.

LIST OF REFERENCE SYMBOLS 10 first tool half
12 through-running boreholes
14 second tool half
20 area for shaping tool
22 embossing surface
24 holder pins
26 embossing surface
28 boreholes
30 area for heater
32 heating plate
34 holder pins
36 heating plate
38 boreholes
40 thermal insulation
42 projection
44 injection nozzles
46 channel for plastic melts
50, 52, 54 tool parts, platens
56 Area for shaping tool
58 Area for heater
60 Thermal insulation
62 Embossing surface
64 Injection nozzles
66 Injection glands
68 boreholes
72 Embossing surface
74 holder pins
76 heating plate
78 holder pins 80 heating plate
82 boreholes
84 projection

What is claimed is:

1. A device for manufacture of a composite piece, which exhibits a shaped plate and at least one plastic functional piece molded on to the shaped plate, comprising:
a heater for heating a plate blank;
a shaping tool with at least two shaping elements and for admitting and shaping of the plate blank, to bring the plate blank into a desired shape and thus to manufacture the shaped plate;
means for insertion of a mass into the shaping tool for molding the plastic functional piece onto the shaped plate in the shaping tool to manufacture the composite piece,
wherein the shaping tool is so configured that after the shaping of the plate blank, at least one cavity of the shaping tool is configured to receive the mass and mold the plastic functional piece; and
a closing unit for opening and closing the shaping tool;
wherein the heater is integrated into the closing unit and the closing unit is furnished to open and close the heater; and
wherein the device is configured as an injection-molding tool with two tool halves, wherein, in each tool half, one of the at least two shaping elements and a part of the heater are arranged next to each other, and the two tool halves are moveable relative to each other by the closing unit to open or to close the shaping tool and the heater with a same stroke.

2. The device according to claim 1, wherein the heating device and the shaping elements are thermally insulated from each other within the closing unit.

3. The device according to claim 1, wherein the means for insertion of the mass into the shaping tool and the cavity in the shaping tool are furnished to mold, cast or foam-apply the plastic functional piece onto the shaped plate.

4. The device according to claim 1 with a gripper device for insertion of the plate blank into the heater, for removal of a heated plate blank from the heater and for insertion of the heated plate blank into the shaping tool and for removal of the completed composite piece from the shaping tool, wherein the gripper device is furnished to remove a completed composite piece and to remove and hold it, while it removes a heated plate blank from the heater and inserts it into the shaping tool and/or while it is inserting a new plate blank into the heater.

5. A device for manufacture of a composite piece, which exhibits a shaped plate and at least one plastic functional piece molded on to the shaped plate, comprising:
a heater for heating a plate blank;
a shaping tool with at least two shaping elements and for admitting and shaping of the plate blank, to bring the plate blank into a desired shape and thus to manufacture the shaped plate;
means for insertion of a mass into the shaping tool for molding the plastic functional piece onto the shaped plate in the shaping tool to manufacture the composite piece,
wherein the shaping tool is so configured that after the shaping of the plate blank, at least one cavity of the shaping tool is configured to receive the mass and mold the plastic functional piece; and
a closing unit for opening and closing the shaping tool;
wherein the heater is integrated into the closing unit and the closing unit is furnished to open and close the heater; and
wherein the device is configured as an injection-molding tool with a multi-platen pressing structure, which exhibits at least three tool parts, wherein the shaping elements of the shaping tool lie opposite on a first and a second tool part and parts of the heater lie opposite on the second and a third tool part, and the tool parts can be moved relative to each other by means of the closing unit.

6. The device according to claim 5, wherein the closing unit is furnished to open or to close the shaping tool and the heater synchronously in the same stroke and/or to open or close the shaping tool and the heater in a tandem operation one after the other.

* * * * *